3,050,519
CYCLOCARBONATE ESTERS OF 16α,17α-
DIHYDROXYPREGNENES
Josef Fried, Princeton, N.J., assignor to Olin Mathieson
 Chemical Corporation, New York, N.Y., a corporation of Virginia
No Drawing. Filed May 13, 1960, Ser. No. 28,838
5 Claims. (Cl. 260—239.55)

This invention relates to, and has for its object, the provision of a method for preparing physiologically active steroids and to the physiologically active steriods produced thereby.

The steroids of this invention include the 16α,17α-cyclocarbonate esters of 16α,17α-dihydroxy steroids of the pregnene series unsubstituted in the C-ring, which series includes, inter alia, compounds having either a pregnene, a pregnadiene, or a pregnatriene nucleus. More particularly, this invention includes 16α,17α-cyclocarbonate esters of pregnenes represented by the following general formula:

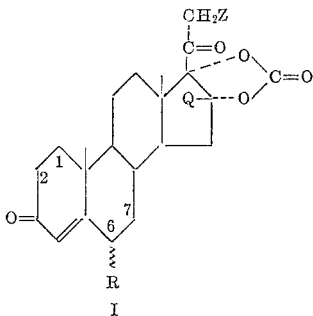

I wherein the 1,2 and/or 6,7 positions are saturated or double bonded; Q is hydrogen or methyl; R is hydrogen, lower alkyl (especially methyl) or halo in either the alpha or beta position; and Z is hydrogen, halogen (especially chloro and fluoro), hydroxy or the acyloxy radical of a hydrocarbon carboxylic acid of less than ten carbon atoms, such as an alkanoic acid especially the lower alkanoic acids (e.g., acetic acid, propionic acid, and hexanoic acid), a monocyclic aromatic carboxylic acid (e.g., benzoic acid, and o, m and p-toluic acids), a monocyclic lower aralkanoic acid (e.g., phenylacetic acid and β-phenylpropionic acid), a lower alkenoic acid, a lower cycloalkanoic acid, or a lower cycloalkenoic acid.

Among the compounds of this invention there may be mentioned the 16α,17α-cyclocarbonate esters of C-ring unsubstituted 16α,17α-dihydroxyprogesterones, which class of esters includes the following:

I. The 16α,17α-cyclocarbonate esters of 6-halogenated 16α,17α-dihydroxyprogesterones, especially the 16α,17α-cyclocarbonate esters of 6-fluoro and 6-chloro-16α,17α-dihydroxyprogesterones, such as the 16α,17α-cyclocarbonate esters of 6α-fluoro-16α,17α-dihydroxyprogesterone, the 16α,17α-cyclocarbonate ester of 6β,21-dichloro-16α,17α-dihydroxyprogesterone, the 16α,17α-cyclocarbonate ester of 6β-fluoro-16α,17α-dihydroxy - 1 - dehydroprogesterone, and the 16α,17α-cyclocarbonate ester of 6α-fluoro-16α,17α,21-trihydroxyprogesterone and 21-esters thereof (e.g. the 21-acetate);

II. The 16α,17α-cyclocarbonate esters of 6-lower alkylated-16α,17α-dihydroxyprogesterones, especially the 16α,17α-cyclocarbonate esters of 6-methyl(or ethyl)-16α,17α-dihydroxyprogesterones, such as the 16α,17α-cyclocarbonate ester of 6α-methyl-16α,17α-dihydroxyprogesterone, the 16α,17α-cyclocarbonate ester of 6β-methyl-16α,17α-dihydroxyprogesterone, the 16α,17α-cyclocarbonate ester of 6β-ethyl-16α,17α-dihydroxyprogesterone, the 16α,17α-cyclocarbonate ester of 6α-ethyl-16α,17α-dihydroxyprogesterone, the 16α,17α-cyclocarbonate ester of 6α-methyl-21-fluoro-16α,17α-dihydroxyprogesterone, the 16α,17α-cyclocarbonate ester of 6α-methyl-16α,17α-dihydroxy-1-dehydroprogesterone, and the 16α,17α-cyclocarbonate ester of 6α-methyl-16α,17α,21 - trihydroxyprogesterone and 21-esters thereof (e.g., the 21-acetate);

III. The 16α,17α-cyclocarbonate esters of 6-dehydro-16α,17α-dihydroxyprogesterones, such as the 16α,17α-cyclocarbonate ester of 6-dehydro-16α,17α-dihydroxyprogesterone, the 16α,17α-cyclocarbonate ester of Δ$^{1,4,6}$-pregnatriene-16α,17α-diol-3,20-dione, the 16α,17α-cyclocarbonate ester of 6-dehydro-16α,17α,21-trihydroxyprogesterone and 21-esters thereof (e.g., the 21-acetate) and the 16α,17α-cyclocarbonate ester of 6-dehydro-16β-methyl-16α,17α-dihydroxyprogesterone; and IV. The 16α,17α-cyclocarbonate esters of 6-unsubstituted 16α,17α-dihydroxyprogesterones, such as the 16α,17α-cyclocarbonate ester of 16α,17α-dihydroxyprogesterone, the 16α,17α-cyclocarbonate ester of 21-fluoro-16α,17α-dihydroxyprogesterone, the 16α,17α-cyclocarbonate ester of 16α,17α-dihydroxy-1-dehydroprogesterone, the 16α,17α-cyclocarbonate ester of 16α,17α,21-trihydroxyprogesterone and 21-esters thereof (e.g. the 21-acetate), and the 16α,17α-cyclocarbonate ester of 16β-methyl-16α,17α-dihydroxyprogesterone.

The compounds of this invention can be prepared by a process of this invention which comprises reacting a steroid of the general formula:

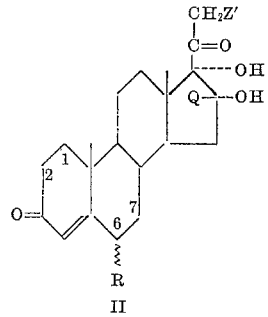

II wherein the 1,2 and/or the 6,7 positions are saturated or double bonded; R and Q are as hereinbefore defined and Z' is hydrogen, halogen (e.g. chloro or fluoro) or an acyloxy radical of a hydrocarbon carboxylic acid of the group hereinbefore defined, with phosgene in the presence of an hydrogen chloride acceptor, such as an organic nitrogen base (e.g., pyridine, collidine, triethanolamine and quinoline), and recovering the 16,17-cyclic ester thus formed. The reaction is preferably carried out at temperatures below 0° C. by treating a solution or suspension of the steroid in the basic medium with phosgene and then recovering the product by conventional procedures.

The steroidal starting materials for preparation of the compounds of this invention are, generally, C-ring unsubstituted derivatives of 16,17-dihydroxyprogesterones. Among the suitable steroidal starting materials there may be mentioned inter alia:

I. 6-halogenated-16α,17α - dihydroxyprogesterones, especially 6-fluoro and 6-chloro-dihydroxyprogesterones, such as 6α-fluoro-16α,17α-dihydroxyprogesterone, and 21-esters of 6α - fluoro - 16α,17α,21 - trihydroxyprogesterone (eg.g the 21-acetate);

II. 6-lower alkylated-16α,17α-dihydroxyprogesterones, especially 6-methyl (or ethyl)-16α,17α-dihydroxyprogesterones, such as 6α - methyl-16α,17α-dihydroxyprogesterone, 6α - ethyl - 16α,17α-dihydroxyprogesterone, 6α-methyl - 16α,17α - dihydroxy-1-dehydroprogesterone, and 21-esters of 6α-methyl-16α,17α,21-trihydroxyprogesterone (e.g., the 21-acetate); and III. 6 - unsubstituted - 16α,17α-dihydroxyprogesterones, such as 16α,17α-dihydroxyprogesterone, 16α,17α-dihydroxy-1-dehydroprogesterone, 21-esters of 16,α17α,21-trihydroxyprogesterone (e.g., the 21-acetate) and 16β-methyl-16α,17α-dihydroxyprogesterone.

Where a particular 1-dehydro steroid is desired and only the corresponding 1,2-saturated derivative is available, the latter can be converted to the former by 1,2-dehydrogenation with *Bacterium cyclooxydans* in accordance with the method set out in Example 1 of U.S. Patent No. 2,822,318.

The 6-halo-16α,17α-dihydroxyprogesterones used herein are described in copending application Serial No. 7,521, filed February 9, 1960. The 6-methyl-16α,17α-dihydroxyprogesterone starting materials used herein are described in application Serial No. 830,467, filed July 30, 1959.

The 21-acyloxy-16,17-esters of this invention can be prepared by the alternative process which comprises treating the 16α,17α,21-trihydroxyprogesterone starting material with acetone and perchloric acid followed by treatment with an acid anhydride corresponding to the acyloxy radical desired to yield the 16α,17α-acetonide-21-acylate which is treated with formic acid to hydrolyze the 16,17-ketal group. The 16α,17α,21-trihydroxy-21-acylate derivative is converted to its 16,17-cyclic ester by the hereinbefore described treatment with phosgene.

The 21-halogenated esters of this invention can alternatively be prepared by treating the corresponding 16,α17α,21-trihydroxyprogesterone with acetone and perchloric acid to yield the corresponding 16,17-acetonide and treating the latter with an organic sulfonyl halide such as mesyl chloride or tosyl chloride to form the 21-sulfonyloxy-16,17-acetonide derivative which is then treated with an alkali metal halide such as lithium chloride, lithium bromide, sodium iodide or potassium bifluoride to yield the corresponding 21-chloride, bromide, iodide, or fluoride, respectively. The 21-halo-16,17-acetonides are deacetonated by hydrolysis with an acid (e.g. formic acid) and then treated with phosgene, as hereinbefore described, to yield the desired 16,17-carbonate esters of this invention.

The 6-dehydro-16,17-esters of this invention may be prepared by reacting the corresponding 6,7-saturated starting material with a 6,7-dehydrogenating agent (e.g., chloranil in a mixture of ethyl acetate and acetic acid) and separating the 6-dehydroderivative thus formed.

The 16β-methyl-16,17-esters of this invention are prepared by ketalizing a 16-methyl-Δ⁵,¹⁶-pregnadiene-3-ol-20-one with a lower alkylene glycol in the presence of an acid catalyst (e.g. toluenesulfonic acid), treating the resulting 20-ethylene ketal derivative with an oxidizing agent such as aluminum tertiary butoxide in cyclohexanone to form the corresponding Δ⁴-3-one which is then converted to 16β-methyl-16α,17α-dihydroxyprogesterone 20-ethylene ketal by treatment with osmium tetroxide followed by a reducing agent such as hydrogen sulfide. The dihydroxy compound is converted to its cyclic carbonate ester by a two step process involving either hydrolysis of the 20-ketal group with an acid (e.g., sulfuric acid) and then esterification at the 16,17-positions or first esterification at the 16,17-positions and then hydrolysis of the ketal radical with an acid (e.g., perchloric acid).

The 6β-methyl and 6β-halo cyclic esters of this invention are prepared by treating a 6β-methylpregnane-5α,16α,17α-triol-3,20-dione (prepared as disclosed in my copending application Serial No. 830,467, filed July 30, 1959) or the corresponding 6β-halo-triol (described in the same application) with phosgene in an organic base as hereinbefore disclosed to simultaneously esterify the 16,17-position and dehydrate the 4,5α-position thereby yielding 6β-methyl-16α,17α-dihydroxyprogesterone-16α,17α-cyclic ester or the 6β-halo-16α,17α-dihydroxyprogesterone 16α,17α-cyclic ester, respectively.

If a 21-acyloxy steroid is employed as the starting material and the corresponding 21-hydroxy steroid is desired as the final product, the 21-acyloxy-16α,17α-dihydroxyprogesterone 16α,17α-cyclic ester product is hydrolyzed as by treatment with an alkali metal carbonate (e.g. potassium carbonate) to yield the desired free 21-hydroxy final product. Alternatively, the 21-acyloxy products of this invention may be converted to the corresponding 11β-hydroxy-21-acyloxy-derivatives by known methods [such as by subjecting the 21-acyloxy-11-desoxy-starting material to microbiological oxidation by the enzymes of *Cunninghamella blakesleeana* as disclosed in Steroids, Fieser, p. 673 (1959)].

The compounds of this invention as represented by Formula I are physiologically active substances which possess progestational and anti-uterotrophic activity and hence can be used in lieu of known progestational agents, such as progesterone, in the treatment of diseases and conditions such as habitual or threatened abortion, amenorrhea, metropathic hemorrhagica, dysmenorrhea, inadequate corpus luteum function and premenstrual tension, being formulated for such administration in the usual perorally or parenterally acceptable formulations.

The following examples illustrate, without limiting this invention (all temperatures being in degrees centigrade):

EXAMPLE 1

*16α,17α-Dihydroxyprogesterone 16α,17α-Carbonate*

To a solution of 1.5 g. of 16α,17α-dihydroxyprogesterone in 30 ml. of anhydrous pyridine is added at 0° with stirring 18.8 ml. of a 10% solution of phosgene in toluene. The reaction is allowed to proceed for 20 minutes at 0° when ice and water is added and the mixture taken up in chloroform. The chloroform extract is washed with water, 1 N sulfuric acid, water, dilute sodium bicarbonate and again with water, dried over sodium sulfate and the solvent removed in vacuo. The resulting residue after recrystallization from acetone-hexane furnishes pure 16α,17α-dihydroxyprogesterone 16α,17α-carbonate having the following properties: M.P. about 240°; $[\alpha]_D^{23}$ +132° (c., 1.67 in chlf.);

$\lambda_{max.}^{alc.}$ 238 mμ (ε=14,700); $\lambda_{max.}^{Nujol}$ 5.50, 5.82, 5.95 and 6.18μ

*Analysis.*—Calc'd for $C_{22}H_{28}O_5$ (372.44): C, 70.94; H, 7.58. Found: C, 71.06; H, 7.41.

EXAMPLE 2

*16α,17α-Dihydroxy-1-Dehydroprogesterone 16α,17α-Carbonate*

To a solution of 1.5 g. of 16α,17α-dihydroxy-1-dehydroprogesterone (prepared by dehydrogenating 16α,17α-dihydroxyprogesterone with *Bacterium cyclooxydans* in accordance with Example 1 of U.S. Patent No. 2,822,318) in 30 ml. of anhydrous pyridine is added at 0° with stirring 18.8 ml. of a 10% solution of phosgene in toluene. The reaction is allowed to proceed for 20 minutes at 0° when ice and water is added and the mixture is taken up in chloroform. The chloroform extract is washed with water, 1 N sulfuric acid, water, dilute sodium bicarbonate and again with water, dried over sodium sulfate and the solvent removed in vacuo leaving the product 16α,17α-dihydroxy-1-dehydroprogesterone 16α,17α-carbonate.

EXAMPLE 3

*16α,17α,21-Trihydroxyprogesterone 16α,17α-Carbonate-21-Acetate*

Following the procedure of Example 1, 16α,17α,21-trihydroxyprogesterone 21-acetate (prepared by treating 100 mg. of 16α-hydroxycortexolone with acetone and 0.01 ml. of 70% perchloric acid to yield the 16,17-acetonide derivative of 16α-hydroxycortexolone which is first transformed to its 21-acetate by treatment with pyridine and acetic anhydride and then to the desired 16α-hydroxycortexolone 21-acetate by hydrolysis of the 16,17-ketal group with 60% aqueous formic acid) is treated with phosgene to yield the product 16α,17α,21-trihydroxyprogesterone 16α,17α-carbonate 21-acetate.

EXAMPLE 4

16β-Methyl-16α,17α-Dihydroxyprogesterone 16α,17α-Carbonate

A. PREPARATION OF Δ$^{5,16}$-16-METHYLPREGNADIENE-3β-OL-20-ONE-20-ETHYLENE KETAL

A mixture of 3 g. of Δ$^{5,16}$-16-methylpregnadiene-3β-ol-20-one, 9 ml. of ethylene glycol and 112 ml. of benzene is heated at reflux with stirring with the aid of a Dean-Stark separator. When 20 ml. of benzene has distilled, 186 mg. of toluene sulfonic acid monohydrate is added to the mixture and the reaction is allowed to proceed with stirring for 16 hours at reflux temperature. After cooling, the mixture is neutralized by the addition of sodium bicarbonate solution followed by the addition of water. The layers are separated, the benzene extract washed with water, dried over sodium sulfate and evaporated to dryness in vacuo. The crystalline residue after recrystallization from acetone furnishes the pure ketal of the following properties: M.P. about 168–169°; $[\alpha]_D^{23}$ —82° (c., 1.25 in chlf.).

*Analysis.*—Calc'd for $C_{24}H_{36}O_3$ (372.53): C, 77.34; H, 9.74. Found: C, 77.22; H, 9.40.

B. PREPARATION OF Δ$^{4,16}$-16-METHYLPREGNADIENE-3,20-DIONE-20-ETHYLENE KETAL

A solution of 2.5 g. of Δ$^{5,16}$-16-methylpregnadiene-3β-ol-20-one 20-ethylene ketal in a mixture of 90 ml. of xylene and 30 ml. of freshly distilled cyclohexanone is distilled until 5 ml. of distillate have been collected. To this solution is added 2.5 g. of aluminum tertiary butoxide and the resulting solution is refluxed for 50 minutes. Water is added and after separation of the layers the aqueous phase is extracted thoroughly with chloroform. The combined xylene and chloroform extracts are dried over sodium sulfate and the solvents and the cyclohexanone removed in high vacuum. The remaining residue is taken up in hexane and chilled, upon which crystallization occurs. Yield: about 1.69 g. The analytically pure material obtained after recrystallization from acetone, exhibits the following properties: M.P. about 175–177°; $[\alpha]_D^{23}$ +61° (c., 1.1 in chlf.);

$\lambda_{max.}^{alc.}$ 240 mμ (ε=15,700); $\lambda_{max.}^{Nujol}$ 5.99, 6.12 and 6.21μ

*Analysis.*—Calc'd for $C_{24}H_{34}O_3$ (370.51): C, 77.80; H, 9.25. Found: C, 77.76; H, 9.38.

C. PREPARATION OF 16β-METHYL 16α,17α-DIHYDROXYPROGESTERONE 20-ETHYLENE KETAL

To a solution of 555 mg. of Δ$^{4,16}$-16-methylpregnadiene-3,20-dione 20-ethylene ketal in 45 ml. of benzene and 2.25 ml. of pyridine is added 438 mg. of osmium tetroxide. The vessel containing the reaction mixture is stored in total darkness at room temperature for 21 hours. 90 ml. of dioxane is then added and the resulting solution saturated with hydrogen sulfide for 7 minutes. The osmium precipitate is centrifuged off and the clear solution added to chloroform and water. The organic layer is washed several times with water, dried over sodium sulfate and evaporated to dryness in vacuo. There remains a crystalline residue which after recrystallization from acetone-hexane furnishes pure 16-methyl-16α,17α-dihydroxyprogesterone 20-ethylene ketal of the following properties: M.P. about 186–187° and about 172–174° (polymorphic modifications); $[\alpha]_D^{23}$ +74° (c., 1.38 in chlf.); +54° (c., 1.24 in methanol);

$\lambda_{max.}^{alc.}$ 240 mμ (ε=16,100); $\lambda_{max.}^{Nujol}$ 2.99, 6.03 and 6.23μ

*Analysis.*—Calc'd for $C_{24}H_{36}O_5$ (404.53): C, 71.25; H, 8.97. Found: C, 70.88; H, 9.19.

D. PREPARATION OF 16β-METHYL-16α,17α-DIHYDROXYPROGESTERONE 16α,17α-CARBONATE 20-ETHYLENE KETAL

To a solution of 200 mg. of 16β-methyl-16α,17α-dihydroxyprogesterone 20-ethylene ketal in 6 ml. of anhydrous pyridine is added at 0° with stirring 3 ml. of a 10% solution of phosgene in toluene. The reaction is allowed to proceed at that temperature for 20 minutes. Ice water is then added and the mixture taken up in chloroform. The chloroform extract is washed with water, 1 N sulfuric acid, water, dilute sodium bicarbonate and again with water, dried over sodium sulfate and the solvent removed in vacuo. The resulting residue after recrystallization from acetone-hexane furnishes pure 16β-methyl-16α,17α-dihydroxyprogesterone 16α,17α-carbonate 20-ethyleneketal.

E. PREPARATION OF 16β-METHYL-16α,17α-DIHYDROXY PROGESTERONE 16α,17α-CARBONATE

To a solution of 100 mg. of 16β-methyl-16α,17α-dihydroxyprogesterone 16α,17α-carbonate 20-ethylene ketal in 12 ml. of methanol is added 1.04 ml. of 70% perchloric acid and the mixture is stirred at room temperature for 16 hours. Water is added and the solution is neutralized with sodium bicarbonate. The bulk of the methanol is removed in vacuo and the resulting suspension extracted with chloroform. The chloroform extract is washed with water, dried over sodium sulfate and evaporated to dryness in vacuo. The residue after recrystallization from methanol yields 16β-methyl-16α,17α-dihydroxyprogesterone 16α,17α-carbonate.

F. ALTERNATIVE PREPARATION OF 16β-METHYL-16α,17α-DIHYDROXYPROGESTERONE 16α,17α-CARBONATE

A solution of 78 mg. of 16β-methyl-16α,17α-dihydroxyprogesterone 20-ethylene ketal in 23 ml. of methanol and .78 ml. of 8% sulfuric acid is heated under reflux for 45 minutes. The mixture is cooled, neutralized with dilute sodium bicarbonate and after removal of the bulk of the methanol in vacuo extracted with chloroform. The chloroform extract is washed with water, dried over sodium sulfate and evaporated to dryness in vacuo. The residual material after recrystallization from acetone-hexane furnishes pure 16β-methyl-16α,17α-dihydroxyprogesterone of the following properties: M.P. about 258–261°; $[\alpha]_D^{23}$ +44° (c., .39 in chlf.);

$\lambda_{max.}^{alc.}$ 239 mμ (ε=17,200); $\lambda_{max.}^{Nujol}$ 2.95, 6.05 and 6.21μ

*Analysis.*—Calc'd for $C_{22}H_{32}O_4$ (360.48): C, 73.30; H, 8.95. Found: C, 73.32; H, 8.92.

Reaction of the 16β-methyl-16α,17α-dihydroxyprogesterone with 10% phosgene in toluene at 0° as described in part D furnishes the 16,17-carbonate identical with the product obtained in part E.

EXAMPLE 5

21-Fluoro-16α,17α-Dihydroxyprogesterone 16α,17α-Carbonate

16α,17α,21-trihydroxyprogesterone is treated with acetone and perchloric acid to form 16α,17α,21-trihydroxyprogesterone 16,17-acetonide which is then treated with mesyl chloride under anhydrous conditions at a temperature of 0°. After two hours, water is added and the precipitated 21-mesylate is removed by filtration, washed thoroughly, dried in vacuo and recrystallized from acetone-hexane. The crystalline mesylate is dissolved in ethylene glycol and treated with potassium bifluoride at reflux temperature for forty hours after which the reaction mixture is diluted with water and the crystals filtered off, dried in vacuo and then recrystalized from acetone-hexane to yield the product 21-fluoro-16α,17α-dihydroxyprogesterone 16α,17α-acetonide.

The 16,17-acetonide is deacetonated by treatment with 60% formic acid at 100° to yield 21-fluoro-16α,17α-dihydroxyprogesterone which is converted by treatment with phosgene and pyridine to the product 21-fluoro-16α,17α-dihydroxyprogesterone 16α,17α-carbonate.

Similarly, except for the introduction of the carbonyl group into the corresponding 21-chloro, 21-bromo and 21- iodo derivatives (prepared by treating the 21-mesylate with lithium chloride, lithium bromide and sodium iodide respectively) there are obtained 21-chloro-16α,17α-dihydroxyprogesterone 16α,17α-carbonate, 21-bromo-16α,17α-dihydroxyprogesterone 16α,17α-carbonate, and 21-iodo-16α,17α-dihydroxyprogesterones 16α,17α-carbonate, respectively.

EXAMPLE 6

*6α-Fluoro-16α,17α-Dihydroxyprogesterone 16α,17α-Carbonate*

To a solution of 100 mg. of 6α-fluoro-16α,17α-dihydroxyprogesterone in 3 ml. of anhydrous pyridine is added at 0° with stirring 1.25 ml. of a solution containing 10% phosgene in toluene. The reaction is allowed to proceed for 20 minutes after which time the water is added and the mixture taken up in chloroform and water. The chloroform layer is separated, washed with water, 1 N sulfuric acid, water, dilute sodium bicarbonate solution and again with water, dried over sodium sulfate and evaporated to dryness in vacuo. The residue (about 110 mg.) after recrystallization from 95% alcohol furnishes about 100 mg. of 6α-fluoro-16α,17α-dihydroxyprogesterone 16,17-carbonate having the following properties: M.P. about 301–302°; $[\alpha]_D^{23}$ +122° (c., 1.04 in chlf.); $\lambda_{max.}^{alc.}$ 234 mµ ($\epsilon$ =15,100); $\lambda_{max.}^{Nujol}$ 5.53, 5.78, 5.90 and 6.14µ

*Analysis.*—Calc'd for $C_{22}H_{27}O_5F$ (390.43): C, 67.69; H, 6.97. Found: C, 67.51; H, 7.00.

EXAMPLE 7

*6α-Chloro-16α,17α-Dihydroxyprogesterone 16α,17α-Carbonate*

Following the procedure of Example 7 an equivalent amount of 6α-chloro-16α,17α-dihydroxyprogesterone (prepared by treating 16α,17α-epoxyprogesterone in dioxane with ethyl orthoformate in ethanol and sulfuric acid to form 3 - ethoxy - 16α,17α - epoxy-$\Delta^{3,5}$-pregnadiene-20-one which is treated in solution with dioxane, with N-chlorosuccinimide and a sodium acetate-acetic acid buffer followed by dilution with water. The resulting 6β-chloro-16α,17α-epoxyprogesterone dissolved in acetic acid, is treated with 33% HBr to yield 6α-chloro-16β-bromo-$\Delta^4$-pregnene-17α-ol-3,20-dione. The latter is converted to its 17α-acetoxy derivative by treatment with acetic anhydride in 70% perchloric acid and this product is treated with sodium acetate in acetic acid to yield 6α-chloro-16α,17α-dihydroxyprogesterone 16α-acetate, which is finally treated with methanolic potassium carbonate to yield the desired 6α-chloro-16α,17α-dihydroxyprogesterone) is treated with phosgene to yield the product 6α-chloro-16α,17α-dihydroxyprogesterone, 16α,17α - carbonate.

EXAMPLE 8

*6α-Fluoro-16α,17α-Dihydroxy-1-Dehydroxyprogesterone 16α,17α-Carbonate*

6α-fluoro-16α,17α-dihydroxyprogesterone 16,17-carbonate is microbiologically 1,2-dehydrogenated in accordance with the procedure of Example 1 of U.S. Patent No. 2,822,318 to yield the product 6α-fluoro-16α,17α-dihydroxy-1-dehydroprogesterone 16α,17α-carbonate.

EXAMPLE 9

*6β-Fluoro-16α,17α-Dihydroxyprogesterone 16α,17α-Carbonate*

A. PREPARATION OF 6β-FLUOROPREGNANE-5α,16α,17α-TRIOL-3,20-DIONE 16α,17α-CARBONATE

To a solution of 100 mg. of 6β-fluoropregnane-5α,16α,17α-triol-3,20-dione (prepared as described in Serial No. 859,840, filed December 16, 1959) in 3 ml. of dry pyridine is added at 0° with stirring 1.25 ml. of a solution containing 10% phosgene in toluene. The reaction is allowed to proceed for 20 minutes after which time water is added and the mixture taken up with chloroform and water. The chloroform layer is separated, washed with water, 1 N sulfuric acid, water, dilute sodium bicarbonate solution and again with water, dried over sodium sulfate and evaporated to dryness in vacuo. The residue after recrystallization from alcohol furnishes the product 6β-fluoro-pregnane-5α,16α,17α-triol-3,20-dione 16α,17α-carbonate.

B. PREPARATION OF 6β-FLUORO-16α,17α-DIHYDROXYPROGESTERONE 16α,17α-CARBONATE

To a solution of 150 mg. of 6β-fluoropregnane-5α,16α,17α-triol-3,20-dione 16α,17α-carbonate in 6 ml. of dry pyridine is added at 0° 0.6 ml. of thionyl chloride. The mixture is allowed to stand at 0° for 30 minutes, after which time ice is added and the mixture extracted with chloroform. The chlorofrm extract is washed with 2 N hydrochloric acid, water, dilute sodium bicarbonate and again with water, dried over sodium sulfate and evaporated to dryness in vacuo. The resulting residue is dissolved in a mixture of 5 ml. of chloroform and 25 ml. of benzene and poured through a column of 1 g. of neutral alumina. The effluent furnishes crystalline material which after recrystallization from acetone-hexane represents pure 6β-fluoro-16α,17α-dihydroxyprogesterone 16α,17α-carbonate.

The product of Example 9 can be dehydrogenated by refluxing it with chloranil in the presence of glacial acetic acid to yield 6-fluoro-16α,17α-dihydroxy-6-dehydroprogesterone 16α,17α-carbonate.

EXAMPLE 10

*6-Dehydro-16α,17α-Dihydroxyprogesterone 16α,17α-Carbonate*

A solution of 250 mg. of 16α,17α-dihydroxyprogesterone 16α,17α-carbonate and 500 mg. of recrystallized chloranil is heated under reflux in a mixture of 10 ml. of ethyl acetate and 2 ml. of glacial acetic acid for 20 hours. The mixture is cooled, poured into water and the layers separated. After additional extraction of the aqueous layer with ethyl acetate, the ethyl acetate extract is washed with 1 N sodium hydroxide solution until the aqueous layer became colorless (7 times). The ethyl acetate extract is washed with water, dried over sodium sulfate and evaporated to dryness in vacuo. The crude residue, which amounts to about 200 mg. is dissolved in benzene and chromatographed on 6 g. of neutral alumina. Elution of the column with 200 ml. of benzene containing 5% chloroform, furnishes about 130 mg. of the crystalline carbonate ester which is analytically pure after recrystallization from acetone-hexane.

EXAMPLE 11

*$\Delta^{1,4,6}$-Pregnatriene-16α,17α-Diol-3,20-Dione 16α,17α-Carbonate*

The product of Example 10 is microbiologically dehydrogenated with *Bacterium cyclooxydans* in accordance with the procedure of Example 1 of U.S. Patent No, 2,822,318 to yield the product $\Delta^{1,4,6}$-pregnatriene-16α,17α-diol-3,20-dione 16α,17α-carbonate.

EXAMPLE 12

*16α,17α,21-Trihydroxy-6-Dehydroprogesterone 16α,17α-Carbonate 21-Acetate*

The product of Example 3, 16α,17α,21-trihydroxyprogesterone 16α,17α-carbonate 21-acetate, is treated with chloranil in ethyl acetate and acetic acid in accordance with the procedure of Example 10 thereby yielding the product 16α,17α,21 - trihydroxy - 6-dehydroprogesterone, 16α,17α-carbonate 21-acetate.

EXAMPLE 13

*6-Methyl-6-Dehydro-16α,17α-Dihydroxyprogesterone 16α,17α-Carbonate*

A solution of 145 mg. of 6α-methyl-16α,17α-dihydroxyprogesterone 16α,17α-carbonate (prepared in Example 16) and 300 mg. of chloranil in a mixture of 7.5 ml. of ethyl acetate and 1.5 ml. of acetic acid is heated under reflux for 42 hours. The reaction mixture is worked up as described in Example 10. Evaporation of the ethyl acetate extract in vacuo yields a residue which is dissolved in 5 ml. of benzene and chromatographed on 4.5 g. of neutral alumina. Elution with benzene (125 ml.) furnishes the crystalline product, 6-methyl-6-dehydro-16α,17α-dihydroxyprogesterone 16α,17α-carbonate.

EXAMPLE 14

6β-Methyl-16α,17α-Dihydroxyprogesterone 16α,17α-Carbonate

To a solution of 190 mg. of 6β-methylpregnane-5α,16α,17α-triol-3,20-dione (prepared as described in my copending application Serial No. 764,495, filed October 1, 1958) in 5 ml. of dry pyridine is added at 0° with stirring 2.5 ml. of a solution containing 10% phosgene in toluene. The reaction is allowed to proceed for 20 minutes and then worked up as in Example 1 to give 6β-methyl-16α,17α-dihydroxyprogesterone 16α,17α-carbonate.

EXAMPLE 15

6β-Methyl-16α,17α-Dihydroxy-1-Dehydroprogesterone 16α,17α-Carbonate

Treatment of the product of Example 14 in accordance with the microbiological dehydrogenation procedure outlined in Example 1 of U.S. Patent 2,822,318, furnishes the product 6β-methyl-16α,17α-dihydroxy-1-dehydroprogesterone 16α,17α-carbonate.

EXAMPLE 16

6α-Methyl-16α,17α-Dihydroxyprogesterone 16α,17α-Carbonate

A. PREPARATION OF 6α-METHYL-16α,17α-DIHYDROXYPROGESTERONE

To a solution of 3.69 g. of 6α-methyl-16-dehydroprogesterone dissolved in 30 ml. of benzene and 3.6 ml. of dry pyridine is added, in the dark, dropwise, with stirring over a period of 2 hours, a solution of 3 g. of osmium tetroxide in 45 ml. of benzene. The resulting mixture is stirred in the dark for an additional 3¼ hours, after which 75 mil. of benzene, 138 ml. of methanol, 204 ml. of water, 21.3 g. of sodium sulfite, and 21.3 g. of potassium bicarbonate is added and the mixture shaken for 18 hours. 250 ml. of chloroform is then added and the resulting suspension shaken for an additional ½ hour, filtered and the precipitate washed 3 times with 100 ml. portions of hot chloroform. After separation of the layers, the organic layer is washed 3 times with water, dried over sodium sulfate and the solvents removed in vacuo. The resulting residue (about 4 g.) on crystallization from acetone affords about 3.72 g. of 6α-methyl-16α,17α-dihydroxyprogesterone, M.P. about 220–226° C. After recrystallization from acetone the pure glycol is obtained with the following properties: M.P. about 224–226° C.; $[\alpha]_D$ +68° (c., .99 in chlf.);

$\lambda_{max.}^{Nujol}$ 2.95, 5.90, 6.02, 6.25μ; $\lambda_{max.}^{alc.}$ 240 mμ (ε=16,500)

*Analysis.*—Calc'd for $C_{22}H_{32}O_4$(360): C, 73.30; H, 8.95. Found: C, 73.44; H, 8.98.

B. PREPARATION OF 6α-METHYL-16α,17α-DIHYDROXYPROGESTERONE 16α,17α-CARBONATE

6α-methyl-16α,17α-dihydroxyprogesterone (100 mg.) is reacted with a solution of 1.25 ml. of phosgene in toluene in 3 ml. of anhydrous pyridine as described in Example 6. The residue remaining after evaporation of the chloroform in vacuo (about 113 mg.) after recrystallization from acetone furnishes about 92 mg. of 6α-methyl-16α,17α-dihydroxyprogesterone 16α,17α-carbonate having the following properties: M.P. about 236–237°; $[\alpha]_D^{23}$ +122° (c., 1.04 in chlf.);

$\lambda_{max.}^{alc.}$ 238 mμ (ε=15,800); $\lambda_{max.}^{Nujol}$ 5.53, 5.79, 5.97 and 6.19μ

*Analysis.*—Calc'd for $C_{23}H_{30}O_5$(386.47): C, 71.48; H, 7.82. Found: C, 71.77; H, 7.80.

EXAMPLE 17

16α,17α-21-Trihydroxyprogesterone 16α,17α-Carbonate

The product of Example 1 is treated with an aqueous solution of potassium carbonate at room temperature. Separation of the precipitate from the reaction mixture yields the product 16α,17α-21 trihydroxyprogesterone 16α-17α-carbonate.

This invention may be variously otherwise embodied within the scope of the appended claims.

What is claimed is:

1. A compound represented by the following general formula

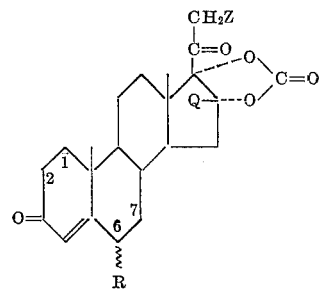

wherein the 1,2 and 6,7 positions are connected by a linkage selected from the group consisting of a single and a double bond; Q is a member selected from the group consisting of hydrogen and methyl; R is a member selected from the group consisting of hydrogen, lower alkyl, fluorine and chlorine; and Z is a member selected from the group consisting of hydrogen, halogen, hydroxy and the acyloxy radical of a hydrocarbon carboxylic acid of less than ten carbon atoms.

2. 16α,17α-dihydroxyprogesterone 16α,17α-carbonate.

3. 21-fluoro-16α,17α-dihydroxyprogesterone 16α,17α-carbonate.

4. 6α-fluoro-16α,17α-dihydroxyprogesterone 16α,17α-carbonate.

5. 6α-methyl-16α,17α-dihydroxyprogesterone 16α,17α-carbonate.

References Cited in the file of this patent

Noller: Chemistry of Organic Compounds, W. B. Saunders Co., Philadelphia, Pa. (1957), p. 741.